No. 607,015. Patented July 12, 1898.
W. W. BRISBEN.
MACHINE FOR MAKING STEEL BALLS.
(Application filed Nov. 21, 1896.)
(No Model.)
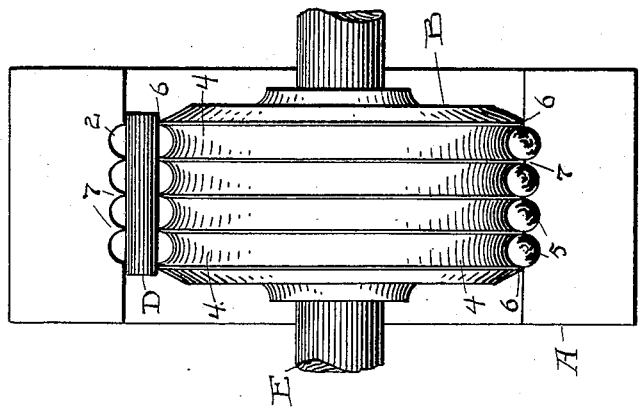
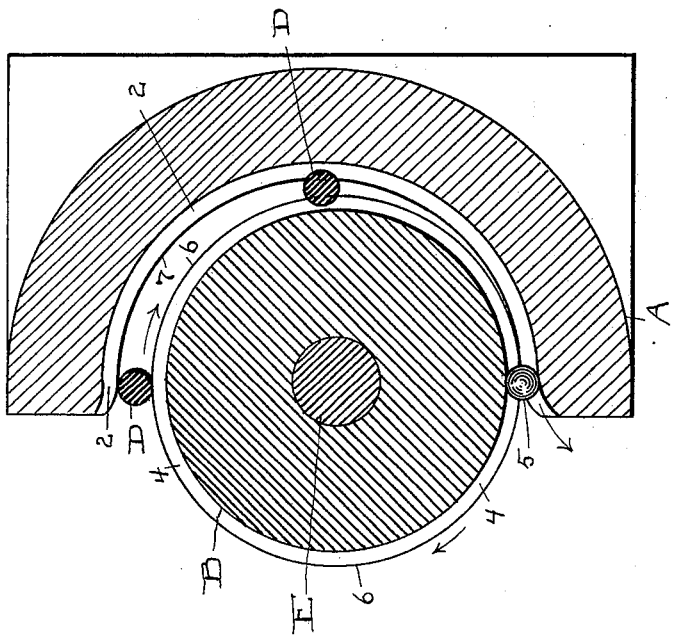
ATTEST
BT. B. Moser
H. E. Mudra.
INVENTOR.
William W Brisben
By H. J. Fisher ATTY

United States Patent Office.

WILLIAM W. BRISBEN, OF CLEVELAND, OHIO.

MACHINE FOR MAKING STEEL BALLS.

SPECIFICATION forming part of Letters Patent No. 607,015, dated July 12, 1898.

Application filed November 21, 1896. Serial No. 613,049. (No model.)

*To all whom it may concern:*

Be it known that I, WILLIAM W. BRISBEN, a citizen of the United States, residing at Cleveland, in the county of Cuyahoga and State of Ohio, have invented certain new and useful Improvements in the Art of Manufacturing Solid Spheres; and I do hereby declare that the following is a full, clear, and exact description of the invention, which will enable others skilled in the art to which it appertains to make and use the same.

My invention relates to the art of manufacturing solid spheres, and particularly steel antifriction-balls for bicycle and like uses.

Referring to the accompanying drawings, Figure 1 is a vertical sectional elevation of a machine made according to my invention, and Fig. 2 is a side view of the portion of the machine illustrated in Fig. 1.

The invention comprises, essentially, two coöperating parts—the stationary base A, having a semicircular concavity provided with a series of parallel grooves 2 on its inside, and the roller B, having a series of concentric grooves 4 corresponding in arrangement and construction to the grooves 2. Both sets of grooves are semicircular in cross-section, and so it occurs that when they are brought together at their edges, as appears at the bottom in Fig. 1, they together form a perfect circle in cross-section. This being true, any object that is rolled in the grooves and given shape thereby necessarily must take on a spherical shape and issue from the machine in that form, as seen by the several balls 5, Fig. 1. Now it will be noticed that the grooved roller B is fashioned on such smaller circle that when it is placed with the edges 6 of its grooves in contact with the edges 7 between the grooves 2, as at the left in Figs. 1 and 2, there is sufficient space left at the opposite side of the concavity to freely introduce the stock or rod D, from which the balls are produced. If the said stock or rod be intended to form antifriction-balls, it will be of suitable steel heated to a working or flowing condition. In this condition it is placed in the bite of the roller B and base A, and since the roller is supported on a shaft E and rotated by any suitable means at a suitable speed the stock or material will at once begin to roll while it works down lower and lower between the two parts A and B, and is thereby gradually severed into ball-forming sections by the comparatively sharp edges 6 and 7 between the grooves 2 and 4, said sections corresponding to said grooves in size and form, and said sections thus being at the same time rolled into spherical form. Both operations of severing the sections and rolling them into spheres are going on at the same time, until at last the severing is completed and the stock is converted into the solid spheres shown at 5, and in this form they leave the machine.

I have described the stationary base part A as semicircular, and so it is shown here; but it might be merely a segment of a circle or it might extend farther around than here shown and form a complete circle and still serve practically the same purpose. Then again the initial or introductory side of the base need not be drawn to a true circle, but both the base and the roller B must be formed on true circular lines from the point where they begin to operate—as, for example, the point where the stock D first appears in the drawings to the finishing-point, where the balls 5 are discharged. In this operation the fiber of the steel is not disturbed and the balls are uniformly pressed from all sides, so as to give them uniform density. They are discharged from this machine in a rough state corresponding to their condition when taken from a lathe in the process first above described, and they are then ready for grinding and hardening as before and by the same means.

The drawings show a machine with four grooves, but I can use many more if I prefer, and thus very materially increase the output of the machine. As it is, the machine is capable of producing balls at a rate which greatly cheapens production and produces a perfectly spherical ball, which readily receives the further treatment of grinding and hardening.

The drawings show a rotating roll and a concave stationary part; but I do not wish to limit myself to this exact construction, because I can accomplish the same result by having the roll stationary and rotating the other part, or by rotating both parts in the same direction or in opposite directions at various speeds.

What I claim as new, and desire to secure by Letters Patent, is—

1. In a machine for making compressed-steel antifriction-balls, a base having a concave surface provided with a series of parallel grooves semicircular in cross-section at all points and cutting edges at their sides, in combination with a roller having a series of semicircular grooves and cutting edges matching the grooves and cutting edges in the base, the said roller being smaller relatively in cross-section than the base from the point where the stock enters to where the finished ball discharges and set into the base so as to bring the cutting edges together at the discharge side of the machine and apart at the entry side, thus causing a gradual and continuous cutting of the stock and compression of the ball from the initial point where the stock is introduced to substantially where the finished product is discharged, substantially as described.

2. In a machine for making compressed-steel antifriction-balls, a fixed base having a concave surface provided with a groove semicircular in cross-section at all points and having uniform cutting edges at its sides, in combination with a roller of uniform cross-section at all points having a smooth semicircular groove of uniform cross-section and with cutting edges extending around its periphery and matching the cutting edges of the base, the said roller set into the said base so as to produce a gradual biting cut from the entry side to the discharge side of the machine, substantially as described.

Witness my hand to the foregoing specification this 5th day of November, 1896.

WILLIAM W. BRISBEN.

Witnesses:
EDWARD DAVIES,
H. T. FISHER.